Jan. 19, 1960  H. N. NERWIN, JR  2,921,466
SONIC THICKNESS MEASURING APPARATUS
Filed Oct. 31, 1957  2 Sheets-Sheet 1
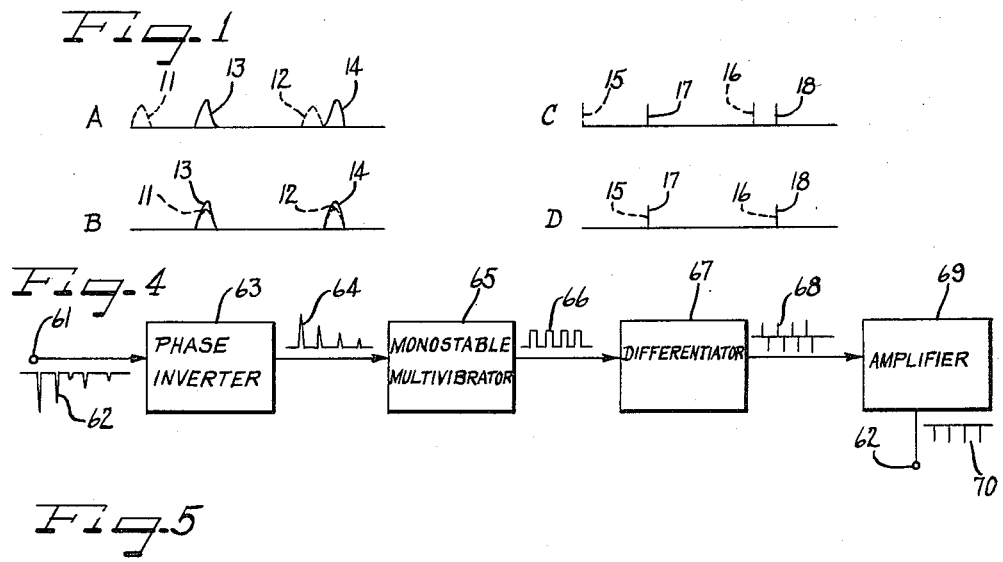
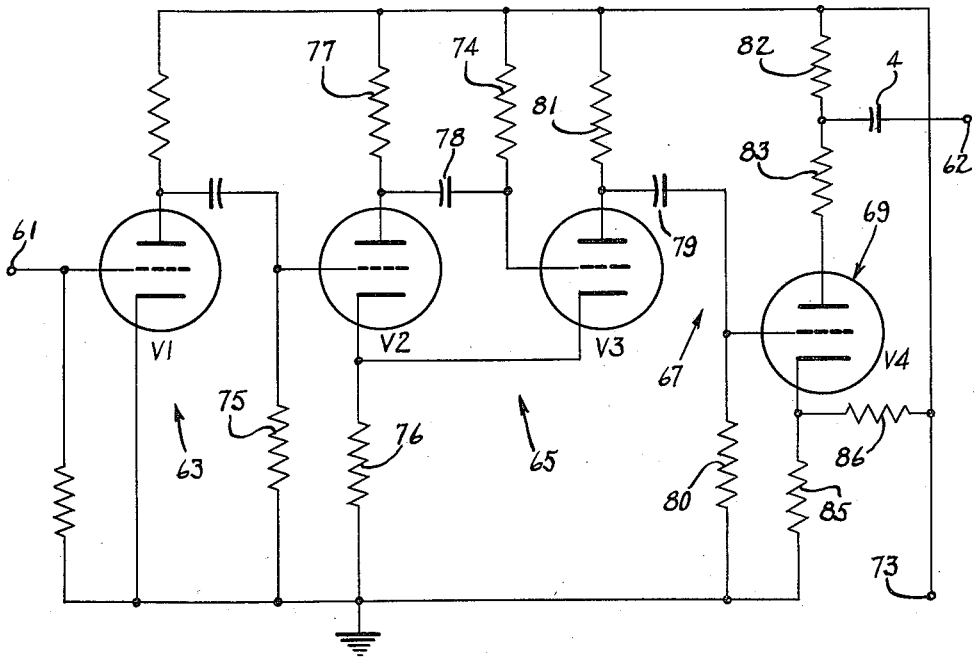
Inventor
Henry N. Nerwin, Jr.

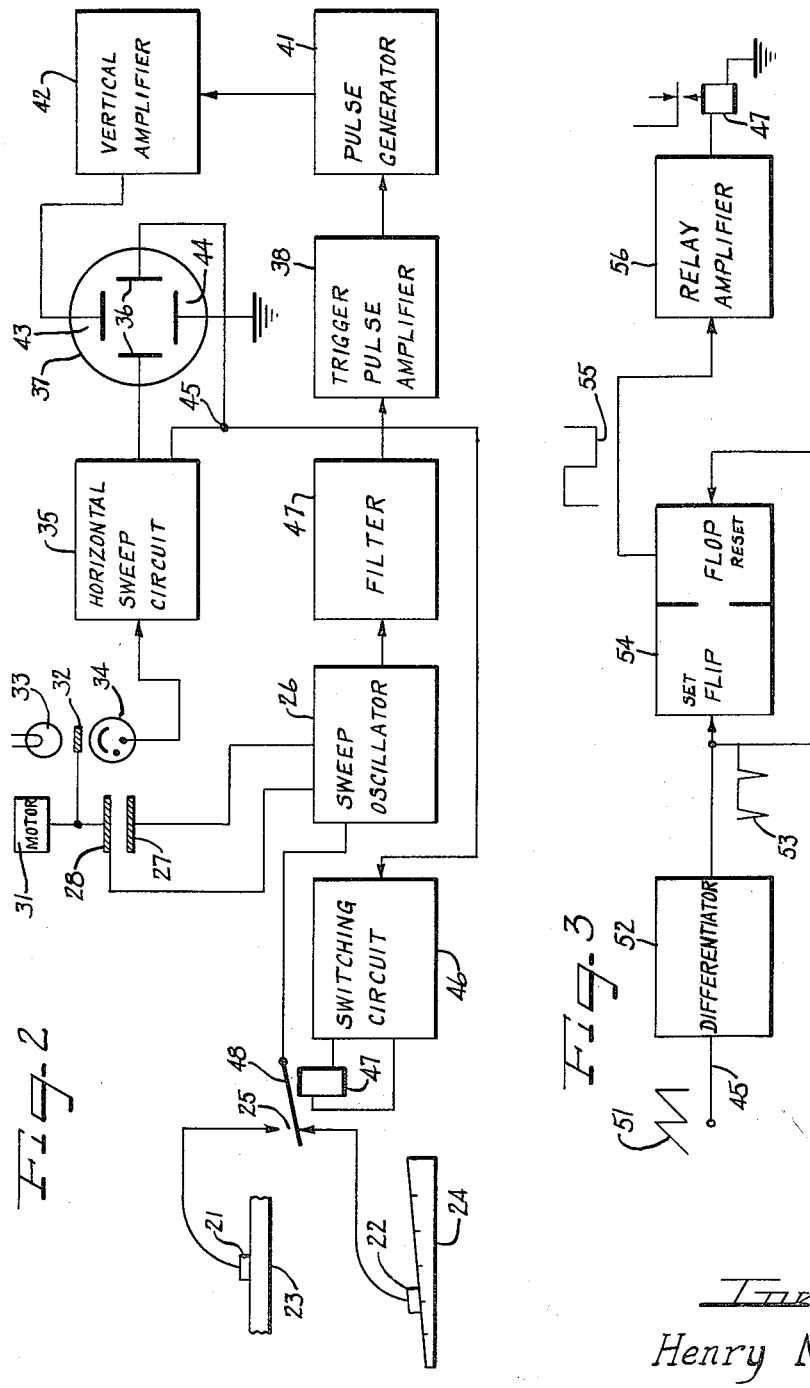

United States Patent Office 2,921,466
Patented Jan. 19, 1960

2,921,466

SONIC THICKNESS MEASURING APPARATUS

Henry N. Nerwin, Jr., Chicago, Ill., assignor to Magnaflux Corporation, Chicago, Ill., a corporation of Delaware Application October 31, 1957, Serial No. 693,632

9 Claims. (Cl. 73—67.8)

This invention relates to sonic thickness measuring apparatus and more particularly to apparatus in which sonic waves are transmitted by an electroacoustical transducer into one face of a part under test to travel through the part and be reflected from the opposite face thereof back to the transducer, to affect the effective electrical impedance of the transducer. Standing wave or resonance effects are produced at certain frequencies, depending upon the velocity of transmission of the sonic waves in the part and the thickness of the part. Since the velocity is constant for any given material, the thickness may be determined by measuring the frequencies at which such resonance effects are produced.

In one form of apparatus heretofore used, the frequency of the electrical signal applied to the transducer is periodically varied through a certain range and a cathode ray tube is utilized with the spot on the face of the tube being deflected in respective transverse directions, one in synchronism with the periodic variation of frequency, and the other by means of a signal responsive to the effective electrical impedance of the transducer. The latter signal will contain one or more pulses generated as the frequency is swept through each resonant frequency. By this means, one or more "pips" are produced on the face of the cathode ray tube and by noting the position of such "pips," the thickness of the part may be determined.

In another form of apparatus, a first transducer is placed on a test part of unknown thickness and a second transducer is placed on a calibrated standard block of gradually varying thickness. The second transducer is then moved along the calibrated standard block until the response obtained with the second transducer is identical with that obtained with the first transducer. The position of the second transducer then indicates the thickness of the test part. The comparison is preferably performed by using a cathode ray tube system such as described above with the transducers being alternately connected to the apparatus in synchronism with the frequency sweep. Thus, two series of "pips" are produced on the face of the cathode ray tube and the second transducer is moved until the "pips" of one series are aligned with the "pips" of the other.

With such prior art systems, it is possible to measure thickness with a high degree of accuracy, but it is necessary to exercise great care in determining the exact positions of the "pips," in the case of the first-described system, and in the exact alignment of the "pips," in the case of the comparison system. It is found also that locating and aligning the "pips" creates considerable eye strain when tests are performed for any substantial length of time as in a production line testing operation, for example.

This invention was evolved with the general object of improving the above-described prior art systems, to increase the accuracy of the thickness determination and to increase the ease of operation.

According to this invention, pulse signals are produced in the same manner as in the above-described systems, but instead of applying the pulse signals directly to the cathode ray tube, each pulse signal is used to generate the secondary pulse signal of a predetermined fixed amplitude and of a predetermined and comparatively short duration, and such secondary pulse signals are applied to the deflection means of the cathode ray tube. It has been discovered that this arrangement greatly increases the accuracy and ease of operation of the system. This appears to be due to the fact that with the prior art systems, there are variations in the amplitude of the "pips" due to attenuation in the material under test and due to variations in the coupling between the transducers and the material. Thus in the prior art systems, it is necessary to visually determine the positions of the peaks of the "pips" in a direction parallel to the direction of the sweep, which requires considerable care with the "pips" being of uneven amplitude. With the system of this invention, the "pips" are of equal amplitude. In addition, secondary pulse signals of a system of this invention produce lines located exactly at right angles to the direction of the sweep and it is found easy to accurately locate and align such lines.

The accuracy and ease of operation of the system of this invention appears to be further due to the fact that in the prior art systems, a background or noise signal is superimposed on the pulse signal applied to the cathode ray tube, thus producing a slight unevenness or flicker in the "pips." By generating the secondary pulse signals, the noise signal is substantially eliminated.

A further important feature of the invention relates to the application of the above-described technique to the comparison system. In particular, the repetition rate of the signals produced by either of the transducers is low enough to produce a flicker effect in the eye, but high enough so that double the rate produces no flicker effect. For example, the repetition rate of the signals applied to the transducers may be 15 cycles per second which is low enough to produce a flicker effect while 30 cycles per second does not. With this feature, there will be a flicker effect with any misalignment of the compared signals, and it will be eliminated only with a complete alignment of the signals. By generating the secondary pulse signal as described above, it is possible to attain complete alignment of the "pips" and the operator need only observe when the flicker is eliminated which in practice is much easier to accomplish than visually aligning the "pips."

Other features, objects, and advantages of the invention will become apparent from the following specification when read in connection with the accompanying drawing in which:

Figure 1A illustrates a signal waveform observed on the face of a cathode ray tube in a typical prior art system when sample specimen and calibrated specimen thicknesses beneath the respective probes do not coincide;

Figure 1B illustrates the waveform observed in such a system when the thicknesses coincide;

Figure 1C illustrates the signal waveform observed when the thicknesses do not coincide and the apparatus is arranged according to the invention;

Figure 1D illustrates the waveform observed with such apparatus when the thicknesses coincide;

Figure 2 is a block-pictorial diagram of an embodiment of the invention;

Figure 3 is a block-diagram of the switching circuit of Figure 2;

Figure 4 is a block diagram of a system for providing pulses of uniform amplitude and duration; and Figure 5 is a schematic circuit diagram of the system of Figure 4.

With reference now to the drawing and more particularly Figure 1 thereof, there are illustrated signal waveforms displayed on the face of a cathode ray tube in typical prior art systems for comparison with the resultant display obtained when applying the principles of the present invention. Referring to Figure 1A, the pulses 11 and 12 are derived in response to excitation of the calibrated specimen probe with energy of a frequency which excites a resonant mode in the calibrated specimen. These pulses are represented by broken lines to distinguish them from pulses 13 and 14 which are derived in response to the test specimen probe being excited with energy of a frequency which excites a resonant mode in the test specimen. As illustrated in Figure 1A, the horizontal positions of the pulses thus derived do not coincide, thereby indicating the thicknesses of the material adjacent to the respective probes differ. The respective probes are energized by the oscillator on alternate sweep cycles, the oscillator sweep rate being 30 cycles. Accordingly, on a first cycle pulses 11 and 12 are displayed and on the next cycle pulses 13 and 14. The repetition rate for each set of pulses, then, is fifteen cycles, and while the eye observes the display of Figure 1A, the presence of flicker is quite noticeable.

Referring to Figure 1B, the waveform which would be observed when the calibrated specimen probe and test specimen probe are adjacent regions of the same thickness is illustrated. Note that pulses 11 and 13 and 12 and 14 respectively occupy substantially the same horizontal position; however, due to variations in probe characteristics and the geometry of the test and calibrated specimens, the pulse amplitudes are not the same and their widths may differ. Accordingly, the waveforms traced out on alternate cycles will not be exactly the same and a flicker will still be observed.

With reference to Figure 1C, there is illustrated a signal waveform observed with apparatus arranged according to the invention when the thicknesses of the material adjacent to the test sample and calibrated sample probes differ. The pulses derived from the calibrated specimen probe are again represented by broken lines; however, both the pulses 15 and 16 derived in response to loading coupled through the latter probe and pulses 17 and 18 derived from coupling from the test specimen probe are seen to be of substantially the same amplitude and duration. When thickness of the respective samples adjacent the respective probes is different, then the pattern of Figure 1C is observed with pulses 15 and 16 displayed on a first cycle followed by pulses 17 and 18 on the next cycle. Accordingly, flicker is observed.

Referring to Figure 1D, there is illustrated the waveform observed on the cathode ray tube when the thicknesses of the material adjacent the respective probes coincide. The horizontal position of the pulses derived from the respective probes then coincides, and since the pulses are of the same duration and amplitude, the signal waveform traced on adjacent cycles is the same and the repetition rate of the pattern then becomes thirty cycles. As a result the flicker disappears, thereby presenting a sharp indication of when the calibrated specimen probe is opposite a region of thickness which exactly coincides with the thickness of the test specimen.

Having described the novel result achieved by the invention, it is appropriate to consider apparatus which embodies the inventive concepts to achieve this result, and reference is now made to the block-pictorial diagram of Figure 2. This is seen to comprise test specimen and calibrated specimen probes 21 and 22 respectively adjacent test specimen 23 and calibrated specimen 24. The probes are alternately coupled through relay contacts 25 to sweep oscillator 26 whose frequency is controlled by the capacity between stator plate 27 and rotor plate 28 which is driven by motor 31. A tab 32, rotated about the axis of motor 31 intercepts the light beam between light source 33 and photocell 34 once for each revolution of motor 31. The output of photocell 34 is utilized to trigger horizontal sweep circuit 35 which provides a sawtooth signal waveform for application to the horizontal deflection plates 36 of cathode ray tube 37. The output of sweep oscillator 26 energizes filter 47 which provides an output pulse for each resonant mode excited in the material whose associated probe is then connected to sweep oscillator 26. Each pulse is amplified by trigger pulse amplifier 38 and then applied to pulse generator 41 to trigger the latter and provide the pulses of uniform amplitude and duration which after amplification by vertical amplifier 42 are applied to vertical deflection plate 43, vertical deflection plate 44 being grounded, thereby providing the display on the face of cathode ray tube 37 illustrated in Figs. 1C and 1D.

The output of horizontal sweep circuit 35 on the positive going line 45 is coupled to switching circuit 46 to energize the relay solenoid 47 on alternate cycles, thereby coupling probes 21 and 22 to sweep oscillator 26 during alternate mutually exclusive time intervals.

The preceding description of the physical arrangement of the apparatus should facilitate understanding its mode of operation which will be best understood by considering a pair of adjacent cycles. A cycle commences with tab 32 interrupting the light beam between light source 33 and photocell 34 and rotor 28 positioned to provide minimum capacity between the latter plate and stator plate 27 whereby sweep oscillator 26, which is swept between upper and lower limit frequencies by rotation of rotor plate 28, then emits the upper limit frequency. Cutting off the light to photocell 34 triggers horizontal sweep circuit 35 and the beam of cathode ray tube 37 is then deflected to the left edge of the horizontal trace. This triggers switching circuit 46 so that relay arm 48 assumes the illustrated position and calibrated specimen probe 22 loads sweep oscillator 26. As rotation of rotor 28 continues, the frequency of sweep oscillator 26 decreases and each time a resonant mode is excited in calibrated sample 24, the oscillator is instantaneously loaded to provide a pulse passed by filter 47 which rejects the higher frequencies from sweep oscillator 26. The filtered pulse is amplified by trigger pulse amplifier 38 and utilized to trigger pulse generator 41. Pulses from pulse generator 41 are amplified by vertical amplifier 42 and applied to vertical deflection plate 43. Since horizontal sweep circuit 35 provides a signal of sawtooth waveform effective in deflecting the beam in cathode ray tube 37 from left to right at a substantially uniform rate, each time the oscillator frequency is of a value which results in excitation of a resonant mode in the material, a pulse of uniform amplitude and duration appears at a corresponding horizontal position on the cathode ray tube. A typical waveform is illustrated in Figure 1C, pulses 15 and 16 being displayed on this cycle.

On completion of the first cycle, tab 32 again interrupts the light beam between light source 33 and photocell 34 to trigger horizontal sweep circuit 35 whereby the trace is again returned to the left and switching circuit 46 is activated to move relay arm 48 and thus couple sample specimen probe 21 to sweep oscillator 26. Operation of the circuit is as described previously when calibrated specimen probe 22 was coupled to sweep oscillator 26; however, pulses 17 and 18 of Figure 1C are now displayed. Probe 22 is then moved along calibrated specimen 24 until the pattern of Figure 1D is observed on the face of cathode ray tube 37, at which time there is an abrupt disappareance of flicker.

In subsequent portions of the drawing, the reference numerals of Figure 1 are retained to identify corresponding elements. Referring to Figure 3, there is illustrated a block diagram of switching circuit 46. The positive going signal waveform 51 derived from horizontal sweep circuit 35 on line 45 is differentiated by differentiator 52 to provide the negative going spikes 53 which are applied to set and reset inputs of flip-flop 54 to provide the signal waveform 55 which is amplified by relay amplifier 56 to energize solenoid 47 on alternate cycles of signal waveform 51.

With reference to Figure 4, there is illustrated a preferred embodiment for providing pulses of uniform duration and amplitude generated by pulse generator 41 of Figure 2. Terminal 61 is energized with negative pulses 62 from trigger pulse amplifier 38 (Figure 2) and inverted by phase inverter 63 to provide the positive pulses 64 which trigger monostable multivibrator 65 to provide an output pulse of substantially uniform duration and amplitude for each input pulse, as represented by signal waveform 66. The latter waveform is differentiated by differentiator 67 to provide the positive and negative spikes 68. Amplifier 69 is appropriately biased to reject responses to the negative spikes and invert only the positive spikes to provide the signal waveform 70 on output terminal 62 which is applied to vertical amplifier 42 (see Figure 2).

Referring to Figure 5, there is illustrated a schematic circuit diagram of pulse generator 41. Negative trigger pulses are applied to terminal 61 and pulses of uniform amplitude and duration are derived in response thereto on terminal 62. Tube V1 comprises a conventional amplifier circuit while tubes V2 and V3 and associated components comprise a cathode coupled monostable multivibrator whose output is amplified by the circuit which includes tube V4. Tube V3 is normally conductive since its grid is connected to the source of positive potential on terminal 73 through resistor 74 while tube V2 is normally non-conductive since the grid is connected to ground through resistor 75 while its cathode is maintained at a relatively high potential as a result of tube V3 drawing current through resistor 76. When a negative trigger pulse is applied to terminal 61, it is inverted and amplified to provide a positive pulse which renders tube V2 conductive. The corresponding drop in potential derived across resistor 77 is coupled through capacitor 78 to the grid of tube V3, thereby cutting off the latter. The V3 remains non-conducting until capacitor 78 discharges through resistors 74 and 77 to the point where the grid-cathode potential of tube V3 is at cutoff. Thus, tube V3 is cut off for a time interval determined substantially by the time constant of the circuit which includes resistors 74 and 77 and capacitor 78 and the cutoff characteristic of tube V3.

Capacitor 79 with resistor 80 form differentiator 67 and differentiate the signal waveform 66 which appears on the plate of tube V3 to provide the spikes 68. Tube V4 is biased at or slightly beyond cutoff by the voltage dividing network formed of resistors 85 and 86 whereby the latter tube is rendered conductive only by the positive spikes of waveform 68 (Figure 4) applied to its grid to provide the negative spikes on output terminal 62. These spikes are displayed on the face of cathode ray tube 37 (Figure 2). The display of sharp spikes is especially advantageous since a precise determination of pulse alignment is facilitated, and minute separation of the pulses displayed on successive sweeps is readily observed.

Since it is only important that the pulse duration and amplitude be the same on adjacent cycles, the absolute value of pulse amplitude and duration and long term stability is unimportant. Accordingly, tubes may be interchanged and potentials varied without effecting the ability of the system to provide a pronounced indication of correspondence between sample specimen and calibrated specimen thicknesses. While sweep frequency repetition rates of other than 30 cycles may be employed while attaining many advantages of the invention, this frequency is especially advantageous, not only because of the flicker characteristic, but also because this repetition frequency may be readily obtained with the embodiment of Figure 2 when motor 31 is a four-pole motor.

The particular embodiment described herein is by way of example only. It is apparent that those skilled in the art may make numerous modifications thereof and departures therefrom without departing from the inventive concepts. Consequently, the invention is to be construed as limited only by the spirit and scope of the appended claims.

What is claimed is:

1. Sonic measuring apparatus for determining the thickness of a sample specimen of material, which apparatus comprises, a swept frequency oscillator, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for displaying said pulses upon a cathode ray tube.

2. Sonic measuring apparatus for determining the thickness of a sample specimen of material, which apparatus comprises, an oscillator whose frequency is swept at a predetermined rate, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for displaying said pulses upon an oscilloscope time base swept at said predetermined rate.

3. Sonic measuring apparatus for determining the thickness of a sample specimen of material, which apparatus comprises, an oscillator whose frequency is swept at a predetermined rate, a calibrated specimen of said material, first and second transducers respectively arranged to exchange electrical and sonic energy between said oscillator and the respective specimens, means for alternately coupling said transducers to said oscillator during mutually exclusive time intervals whereby resonant modes may be excited in said material, means for deriving a pulse of substantially the same amplitude and duration in response to each resonant mode excited in said specimens, and means for visually displaying said pulses upon a time base which is recurrently swept at said predetermined rate.

4. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is swept at a predetermined rate, means for alternately coupling said transducers to said oscillator during mutually exclusive time intervals whereby the connected transducer may interchange electrical and sonic energy between said oscillator and material respectively to effect a marked increasing in the loading of the former when its contemporary frequency corresponds to the frequency at which a resonant mode is excited in the latter, means responsive to each such loading for deriving pulses of substantially the same amplitude and duration, and means for visually displaying said pulses on a time base which recurs at a rate which is an integral multiple of said predetermined rate.

5. Sonic measuring apparatus for determining the thickness of a specimen of material, which apparatus comprises, a wedge of said material whose thickness is calibrated along its length, first and second transducers respectively arranged adjacent to said wedge and said specimen, an oscillator whose frequency is recurrently swept at a predetermined rate, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to the frequency at which a resonant mode is excited in the latter, means responsive to each such loading for deriving pulses of substantially the same amplitude and duration, and means for visually displaying said pulses upon a time base which recurs at a rate equal to said predetermined rate whereby pulses displayed in the same position during adjacent ones of said time intervals are viewed without flicker while all other pulses are viewed with flicker.

6. Sonic measuring apparatus for determining the thickness of a specimen of material, which apparatus comprises, a wedge of said material whose thickness is calibrated along its length, first and second transducers respectively arranged adjacent to said wedge and said specimen, a swept frequency oscillator, means for alternately coupling said transducers to said oscillator during mutually exclusive time intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses substantially of the same amplitude and duration, and means for displaying said pulses upon the face of a cathode ray tube at positions thereon related to the contemporary oscillator frequency.

7. Sonic measuring apparatus for determining the thickness of a specimen of material, which apparatus comprises, a wedge of said material whose thickness is calibrated along it length, first and second transducers respectively arranged adjacent to said wedge and said specimen, a sweep oscillator whose frequency is controlled by the capacity between a stator and rotor, a motor which rotates said rotor to vary said capacity, a switching circuit which effects the coupling of one of said transducers to said sweep oscillator, whereby the connected transducer may interchange electrical and sonic energy between said oscillator and material respectively to affect a marked increase in the loading of the former when its contemporary frequency corresponds to that at which a resonant mode is excited in the latter, means responsive to each such loading for deriving a trigger pulse, a pulse generator which responds to each trigger pulse by providing an output pulse of substantially uniform amplitude and duration, a cathode ray tube with first and second pairs of orthogonally oriented deflection plates, means for applying the pulse generator output pulses to said first pair of deflection plates, a sweep circuit which provides a sawtooth pulse in response to the start of each revolution of said motor, means for coupling said sawtooth pulse to said switching circuit whereby the latter responds to the trailing edge of said sawtooth pulse by coupling the other transducer to said sweep oscillator instead of said one, and means for coupling each sawtooth pulse to said second pair of deflection plates whereby output pulses from said pulse generator are displayed on said cathode ray tube at positions thereon indicative of the frequency at which a resonant mode is excited.

8. Sonic measuring apparatus for determining the thickness of a specimen of material, which apparatus comprises, a wedge of said material whose thickness is calibrated along its length, first and second transducers respectively arranged adjacent to said wedge and said specimen, a sweep oscillator whose frequency is repetitively swept at a first predetermined rate, means for alternately coupling said transducers to said oscillator during mutually exclusive sweep intervals whereby the connected transducer may interchange electrical and sonic energy between said oscillator and material respectively to effect a marked increase in the loading of the former when its contemporary frequency corresponds to that at which a resonant mode is excited in the latter, means responsive to each such loading for deriving pulses of substantially the same amplitude and duration, a cathode ray tube having first and second pairs of orthogonally oriented deflection plates, means responsive to the initiation of each sweep interval for deriving a deflection signal and applying same to said first pair of deflection plates whereby the beam of the cathode ray tube is deflected to occupy a position between said plates indicative of the contemporary frequency of said sweep oscillator, means for applying said pulses of substantially the same amplitude and duration to said second pair of deflection plates whereby the latter pulses are displayed on the cathode ray tube at positions indicative of the frequencies at which resonant modes are excited, said predetermined rate being of the order of 30 cycles per second whereby the display of pulses at the same position on the cathode ray tube during successive sweep intervals is viewed without flicker while other pulses are viewed with flicker.

9. In a sonic thickness measuring system, a sonic transducer arranged to be disposed against the surface of a test piece, a high frequency generator coupled to said transducer, means periodically operable for gradually changing the frequency of said generator through a certain range, a monostable multivibrator arranged to respond to any triggering pulse signal of greater than a certain amplitude to develop an output pulse of fixed amplitude and duration, coupling means connecting said monostable multivibrator in circuit with said transducer and said generator to apply a series of triggering pulses to said mutivibrator as the frequency passes through values at which thickness resonance effects are produced in the test piece, an oscilloscope having a sweep circuit operated in synchronism with said periodic variation of frequency, and means for applying to said oscilloscope said output pulses of fixed amplitude and duration from said monostable multivibrator.

References Cited in the file of this patent

UNITED STATES PATENTS

| | | |
|---|---|---|
| 2,408,078 | Labin et al. | Sept. 24, 1946 |
| 2,431,234 | Rassweiler et al. | Nov. 18, 1947 |
| 2,441,957 | De Rosa | May 25, 1948 |
| 2,640,106 | Wilson et al. | May 26, 1953 |
| 2,687,338 | Davis | Aug. 24, 1954 |
| 2,839,916 | Van Valkenburg et al. | June 24, 1958 |

Notice of Adverse Decision in Interference

In Interference No. 91,686, involving Patent No. 2,921,466, H. N. Nerwin, Jr., Sonic thickness measuring apparatus, final judgment adverse to the patentee was rendered June 8, 1962, as to claims 1, 2, 3, 4, 5, 6, and 8.

[*Official Gazette July 10, 1962.*]